United States Patent
Matsuo

(10) Patent No.: US 8,314,954 B2
(45) Date of Patent: Nov. 20, 2012

(54) INSTRUCTION INFORMATION MANAGEMENT METHOD, INSTRUCTION INFORMATION MANAGEMENT APPARATUS, PRINTING APPARATUS, PRINTING SYSTEM AND COMPUTER READABLE MEDIUM

(75) Inventor: Yoshie Matsuo, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1203 days.

(21) Appl. No.: 12/130,450

(22) Filed: May 30, 2008

(65) Prior Publication Data

US 2009/0059276 A1    Mar. 5, 2009

(30) Foreign Application Priority Data

Aug. 30, 2007    (JP) .................. 2007-224133

(51) Int. Cl.
*G06K 15/00* (2006.01)
*G06F 3/12* (2006.01)
(52) U.S. Cl. .................. 358/1.14; 358/1.13; 358/1.15
(58) Field of Classification Search .................. None
See application file for complete search history.

(56) References Cited

U.S. PATENT DOCUMENTS

| | | |
|---|---|---|
| 2003/0126039 A1 | 7/2003 | Kiyose et al. |
| 2007/0008581 A1* | 1/2007 | Han .................. 358/1.15 |
| 2007/0033287 A1 | 2/2007 | Kiyose et al. |
| 2008/0010079 A1* | 1/2008 | Genda .................. 705/1 |

FOREIGN PATENT DOCUMENTS

| | | |
|---|---|---|
| JP | 5-143253 A | 6/1993 |
| JP | 2003-209642 A | 7/2003 |
| JP | 2003-291462 A | 10/2003 |
| JP | 2005-277744 A | 10/2005 |
| JP | 2005-342964 A | 12/2005 |
| JP | 2006-203509 A | 8/2006 |
| JP | 2006-255936 A | 9/2006 |
| JP | 2007-047923 A | 2/2007 |
| JP | 2007-098590 A | 4/2007 |

OTHER PUBLICATIONS

Notification dated Mar. 6, 2012, Issued by the Japanese Patent Office in counterpart Japanese Application No. 2007-224133.

* cited by examiner

*Primary Examiner* — Dov Popovici
(74) *Attorney, Agent, or Firm* — Sughrue Mion, PLLC

(57) ABSTRACT

A computer readable medium storing a program causing a computer to execute a process for controlling a printing process, the process including: receiving instruction information including (i) a content of the printing process for printing image data and (ii) identification information of an instruction user instructing the printing process, the content of the printing process which includes detailed information for printing the image data; acquiring when the instruction information is received, third-person information indicating a third person staying around a printing apparatus which performs the printing process; determining whether or not the third person indicated by the acquired third-person information has a certain relation with the instruction user indicated by the identification information included in the received instruction information; and determining a mode of the printing process in the printing apparatus; and controlling the printing process in the determined mode.

7 Claims, 10 Drawing Sheets

| INSTRUCTION INFORMATION ID | TARGET DATA NAME | INSTRUCTION USER NAME | OUTPUT SPOT |
|---|---|---|---|
| Job1 | DEVELOPMENT PROJECT | USER A | FIRST PRINTER |
| Job2 | REPORT | USER B | SECOND PRINTER |
| Job3 | PROPOSAL | USER C | FIRST PRINTER |
| Job4 | CONFERENCE DATA | USER A | FIRST PRINTER |
| Job5 | MINUTES | USER D | SECOND PRINTER |
| ⋮ | ⋮ | ⋮ | ⋮ |

| USER NAME | PERSON FOR WHOM PRINT SHOULD BE OUTPUT IN CONFIDENTIAL MODE |
|---|---|
| USER A | USER B, OUTSIDER |
| USER B | USER A, USER C, USER D, OUTSIDER |
| USER C | USER A, OUTSIDER, SALES DECISION |
| USER D | OUTSIDER, DEVELOPMENT DIVISION |
| ⋮ | ⋮ |

FIG. 8

| INSTRUCTION INFORMATION ID | TARGET DATA NAME | INSTRUCTION USER NAME | OUTPUT SPOT | PRINTING MODE | PROCESSING STATE | COMPLETION TIME |
|---|---|---|---|---|---|---|
| Job1 | DEVELOPMENT PROJECT | USER B | FIRST PRINTER | DIRECT PRINTING | PRINTING | |
| Job2 | REPORT | USER C | SECOND PRINTER | DIRECT PRINTING | COMPLETION | 2007/8/27 11:35:24 |
| Job3 | PROPOSAL | USER A | FIRST PRINTER | DIRECT PRINTING | PRINTING | |
| Job4 | MINUTES | USER D | SECOND PRINTER | CONFIDENTIAL PRINTING | RESERVATION | |
| Job5 | ESTIMATE | USER A | FIRST PRINTER | DIRECT PRINTING | PRINTING | |
| Job6 | WEEKLY | USER B | FIRST PRINTER | DIRECT PRINTING | COMPLETION | 2007/8/27 12:15:35 |
| ... | ... | ... | ... | ... | ... | ... |

411B

INSTRUCTION INFORMATION MANAGEMENT METHOD, INSTRUCTION INFORMATION MANAGEMENT APPARATUS, PRINTING APPARATUS, PRINTING SYSTEM AND COMPUTER READABLE MEDIUM

CROSS-REFERENCE TO RELATED APPLICATIONS

This application is based on and claims priority under 35 USC 119 from Japanese Patent Application No. 2007-224133 filed Aug. 30, 2007.

BACKGROUND

1. Technical Field

The present invention relates to an instruction information management method, an instruction information management apparatus, a printing apparatus, and a printing system and a computer readable medium.

2. Related Art

Conventionally, a printing apparatus that controls a confidential printing mode waiting for printout until completing a user's certification is known.

SUMMARY

[1] According to an aspect of the invention, a computer readable medium storing a program causes a computer to execute a process for controlling a printing process, the process comprising: receiving instruction information including (i) a content of the printing process for printing image data and (ii) identification information of an instruction user instructing the printing process, the content of the printing process which includes detailed information for printing the image data; acquiring when the instruction information is received, third-person information indicating a third person staying around a printing apparatus which performs the printing process; determining whether or not the third person indicated by the acquired third-person information has a certain relation with the instruction user indicated by the identification information included in the received instruction information; determining a mode of the printing process in the printing apparatus; and controlling the printing process in the determined mode.

BRIEF DESCRIPTION OF THE DRAWINGS

Exemplary embodiments of the present invention will be described in detail based on the following figures, wherein:

FIG. 5A is a diagram illustrating an example of an instruction information management table;

FIG. 5B is a diagram illustrating an example of a confidential mode output table;

FIG. 8 is a diagram illustrating an example of an instruction information management table;

DETAILED DESCRIPTION

First Exemplary Embodiment

Figure 1:
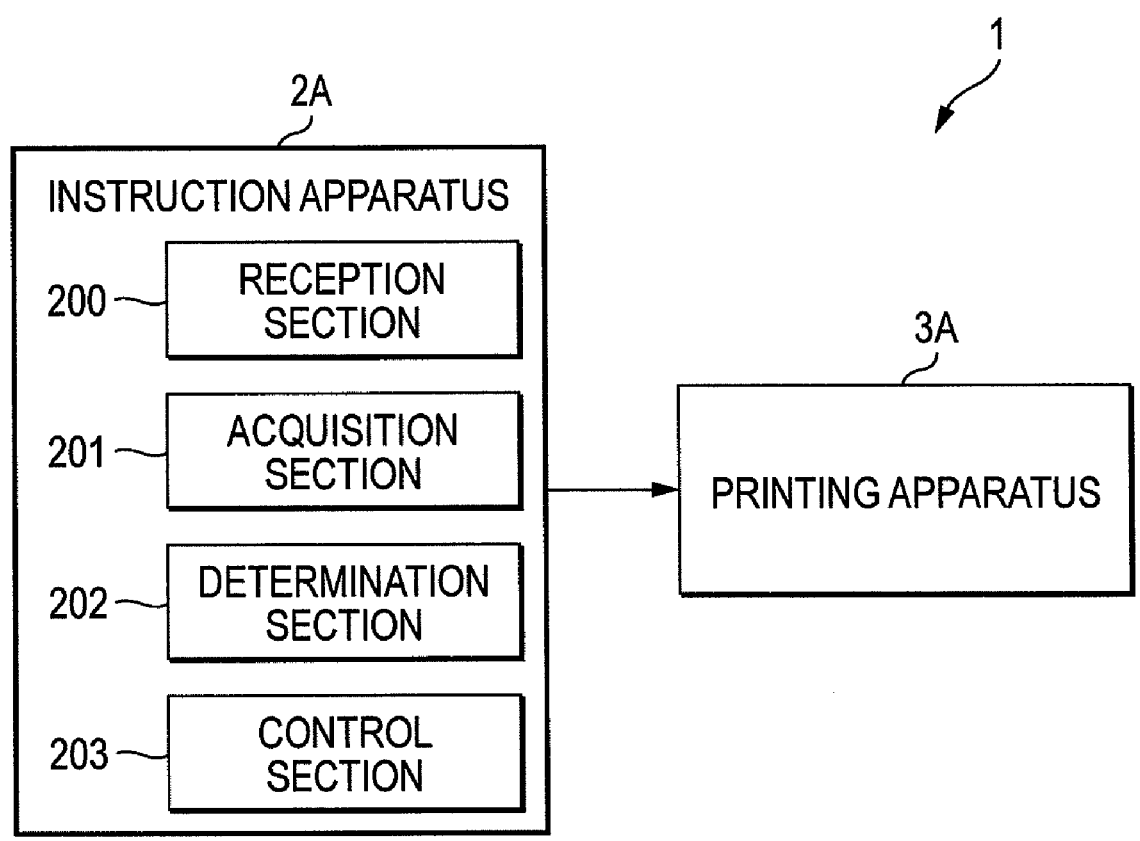
FIG. 1 is a general diagram illustrating an example of a schematic configuration of a printing system according to the first exemplary embodiment of the invention.

FIG. 1 is a general diagram illustrating an example of a schematic configuration of a printing system according to a first exemplary embodiment of the invention. The printing system 1 includes a printing apparatus 3A that performs a printing process on the basis of instruction information relating to the printing process, and an instruction apparatus 2A that receives instruction information and controls the printing process to be performed on the basis of the instruction information, according to circumstances around the printing apparatus 3A.

Herein, "instruction information" is defined as information for instructing the printing apparatus 3A to perform a printing process. The instruction information includes a content of the printing process and identification information of an instruction user instructing the printing process. The content of the printing process includes, for example, a target data name indicating image data to be printed, the number of printing copies, a size of paper, a color mode indicating a black-and-white printing process or a color printing process, or the like.

The instruction information may include printing mode information indicating any one printing mode of a confidential printing mode in which the printing process is performed when a printing apparatus 3A is operated and a direct printing mode in which the printing process is performed without waiting for the printing apparatus 3A being operated. In case where the printing system 1 has plural printing apparatuses, the instruction information may includes output spot information for instructing a printing apparatus that performs a printing process among the plural printing apparatuses In addition, "around" is defined as a state where a third person other than an instruction user instructing a printing process stays around the printing apparatus 3A as near as the third person may acquire prints printed by the printing apparatus 3A or may see the contents of the prints, and may be defined as a state where there is a possibility that a third person acquires prints printed by the printing apparatus 3A or sees the contents of the prints. For example, it is conceivable a state a third person stays in a room where the printing apparatus 3A is installed, or a state where there is a possibility that a third person comes for paper printed by the printing apparatus 3A for oneself.

[Instruction Apparatus]

The instruction apparatus 2A includes reception section 200, acquisition section 201, determination section 202, and control section 203. Such an instruction section 2A may be configured of, for example, a server, a personal computer (PC), a work station (WS), or the like.

The reception section 200 receives the instruction information including the content of the printing process and the identification information as stated above.

The acquisition section 201 acquires third-person information indicating a third person staying around the printing apparatus 3A that performs the printing process, when the instruction information is received by the reception section 200.

For example, the acquisition section 201 acquires the third-person information on the basis of an entering-leaving history having entering and leaving records about an area such as a room, a floor, and a building in which the printing apparatus 3A is installed, regarding a person entering the area as the third person. In addition, the acquisition section 201 acquires the third-person information, when the printing apparatus 3A is performing instruction information, regarding the person indicated by the identification information included in the instruction information that is being performed, as the third person.

The determination section 202 determines whether or not the third person indicated by the third-person information acquired by the acquisition section 201 has a certain relation with the person indicated by the identification information included in the instruction information received by the reception section 200, that is, an instruction user instructing the printing process. Details of the determination method thereof will be described in another exemplary embodiment.

Herein, "has a certain relation" is defined as a relation, in which release of information is permissible for a third person, with an instruction user instructing a printing process. One person X may not have a certain relation with the other person X, even when the other person Y has the certain relation with one person X.

The control section 203 determines a mode of the printing process in the printing apparatus 3A on the basis of the result determined by the determination section 202 and controls the printing process.

In addition to the confidential printing mode and the direct printing mode, The mode of the printing process may be, for example, a password printing mode in which a password is appended when the printing apparatus 3A performs a printing process on an electronic paper to write image data in a memory of the electronic paper, and the image data written in the memory is displayed on the electronic paper when the password is released.

[Printing Apparatus]

The printing apparatus 3A performs a printing process on the basis of instruction information transmitted from an instruction information management server 4A. Such a printing apparatus may be configured of, for example, a printer performing a printing process by a printing method such as an electrophotographic method, an inkjet method, and a thermosensitive transfer method, and a multi function machine having plural functions such as copy, scan, and fax.

The instruction apparatus 2A acquires third-person information indicating a third person staying around the printing apparatus 3A by the acquisition section 201, when the instruction information is received by the reception section 200. The determination section 202 determines whether or not the third person indicated by the third-person information has a certain relation with the instruction user instructing the printing process of the instruction information to be performed. The control section 203 controls the printing apparatus 3A to perform the printing process (i) in a confidential printing mode when the determined result indicates that the third person doesn't have the certain relation with the instruction user and (ii) in a direct printing mode when the determined result indicates that the third person has the certain relation with the instruction user.

Second Exemplary Embodiment

Figure 2:
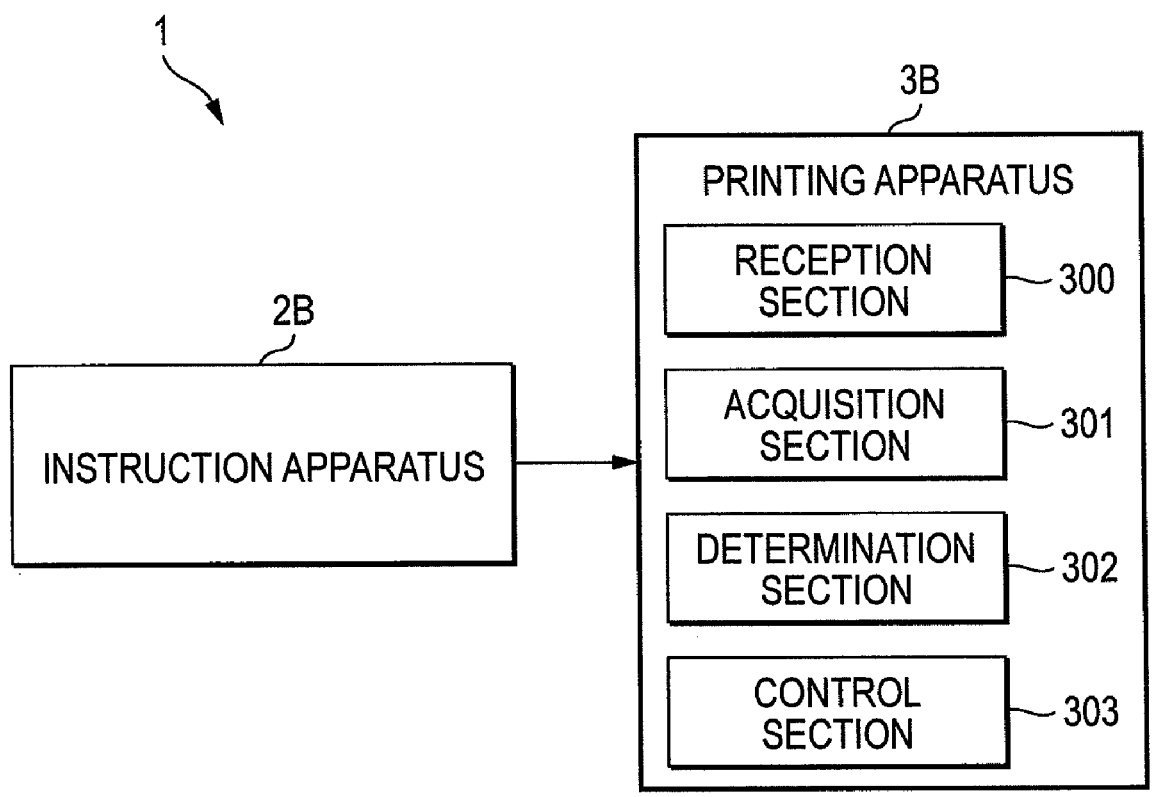
FIG. 2 is a general diagram illustrating an example of a schematic configuration of a printing system according to the second exemplary embodiment of the invention.

FIG. 2 is a general diagram illustrating an example of a schematic configuration of a printing system according to a second exemplary embodiment of the invention. In the printing system according to the first exemplary embodiment, the instruction apparatus 2A controls the printing process to be performed on the basis of the state around the printing apparatus 3A. However, in the printing system 1 according to the second exemplary embodiment, a printing apparatus 3B controls a printing process to be performed on the basis of a state around the printing apparatus 3B.

That is, the printing system 1 according to the present exemplary embodiment includes an instruction apparatus 2B that transmits instruction information about a printing process, and a printing apparatus 3B that receives the instruction information transmitted from the instruction apparatus 2B and controls the printing process based on the instruction information to be performed on the basis of the state around the printing apparatus 3B.

(Instruction Apparatus)

The instruction apparatus 2B transmits instruction information relating to a printing process performed by the printing apparatus 3B to the printing apparatus 3B. The instruction apparatus 2B may be configured of, for example, a server, a personal computer (PC), a work station (WS), or the like, similarly with the first exemplary embodiment.

(Printing Apparatus)

The printing apparatus 3B includes reception section 300 for receiving instruction information from the instruction apparatus 2B, acquisition section 301 for acquiring third-person information indicating a third person staying around the printing apparatus 3B when the instruction information is received by the reception section 300, determination section 302 for determining whether or not the third person indicated by the third-person information has a certain relation with a person indicated by identification information of the instruction information, and control section 303 for determining a mode of a printing process and controlling the printing process on the basis of the result determined by the determination section 302. The printing apparatus 3B may be configured of, for example, a printer, a multiple function machine, or the like, similarly with the first exemplary embodiment.

The printing apparatus 3B acquires the third-person information indicating the third person staying around the printing apparatus 3B by the acquisition section 301 when the instruction information is received from the instruction apparatus 2B by the reception section 300. The determination section 302 determines whether or not the third person indicated by the third-person information has a certain relation with an instruction user indicating the instruction information. The control section 303 controls the printing process to be performed (i) in a confidential printing mode when the determined result indicates that the third person doesn't have the certain relation with the instruction user and (ii) in a direct printing mode when the determined result indicates that the third person has the certain relation with the instruction user.

Third Exemplary Embodiment

Figure 3:
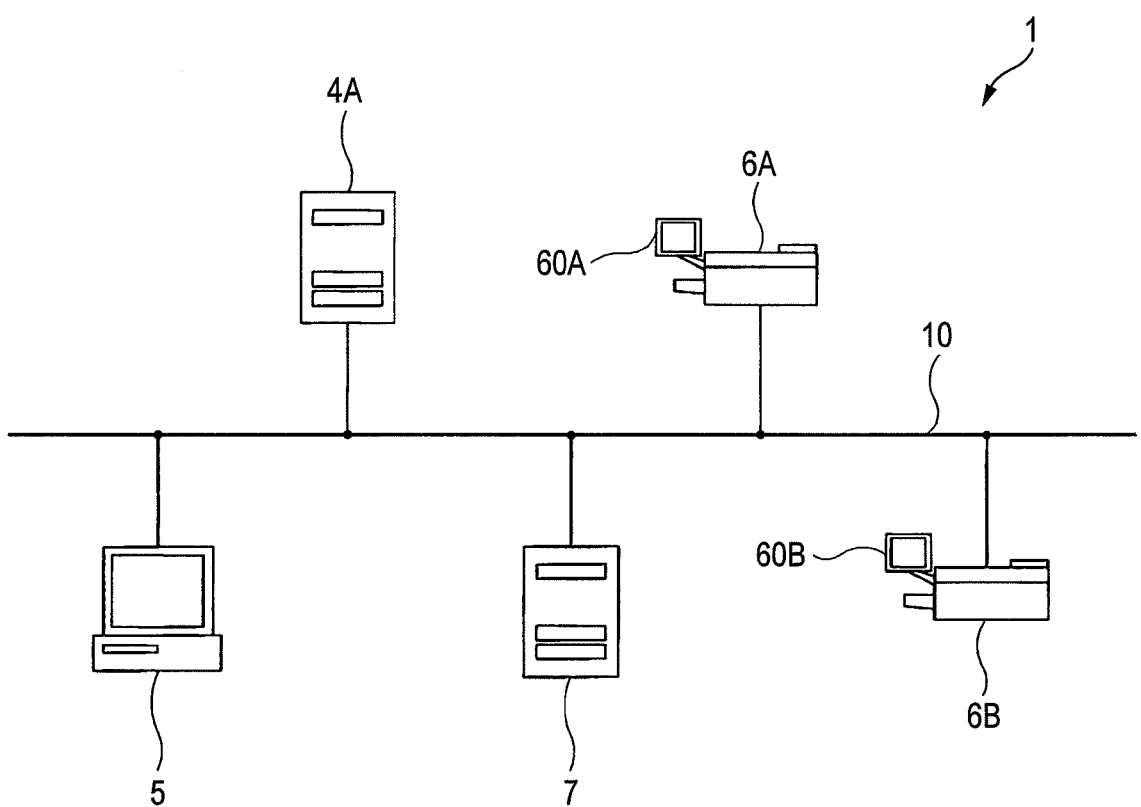
FIG. 3 is a general diagram illustrating an example of a schematic configuration of a printing system according to the third exemplary embodiment of the invention.

FIG. 3 is a general diagram illustrating an example of a schematic configuration of a printing system according to a third exemplary embodiment of the invention. The printing system 1 includes a terminal 5 that inputs instruction information relating to a printing process, an instruction information management server 4A that receives the instruction information from the terminal 5 and controls the printing process based on the instruction information to be performed, first and second printers 6A and 6B that perform the printing process on the basis of the instruction information, an entering-leaving management apparatus 7 that manages a record of a third person entering and leaving rooms where the first and second printers 6A and 6B are installed, respectively, and a network 10 that connects them to one another.

The first and second printers 6A and 6B have touch pad displays configured by piling a touch panel up on a surface of a display, or display operation units 60A and 60B having a hard key such as a start key, respectively, and perform a printing process on the basis of the instruction information transmitted from the instruction information management server 4A.

In FIG. 3, the number of terminal 5 is 1, but the number of terminals may be 2 or more. In addition, the number of the first and second printers 6A and 6B is 2, but may be 1, and 3 or more.

[Instruction Information Management Server]

Figure 4:
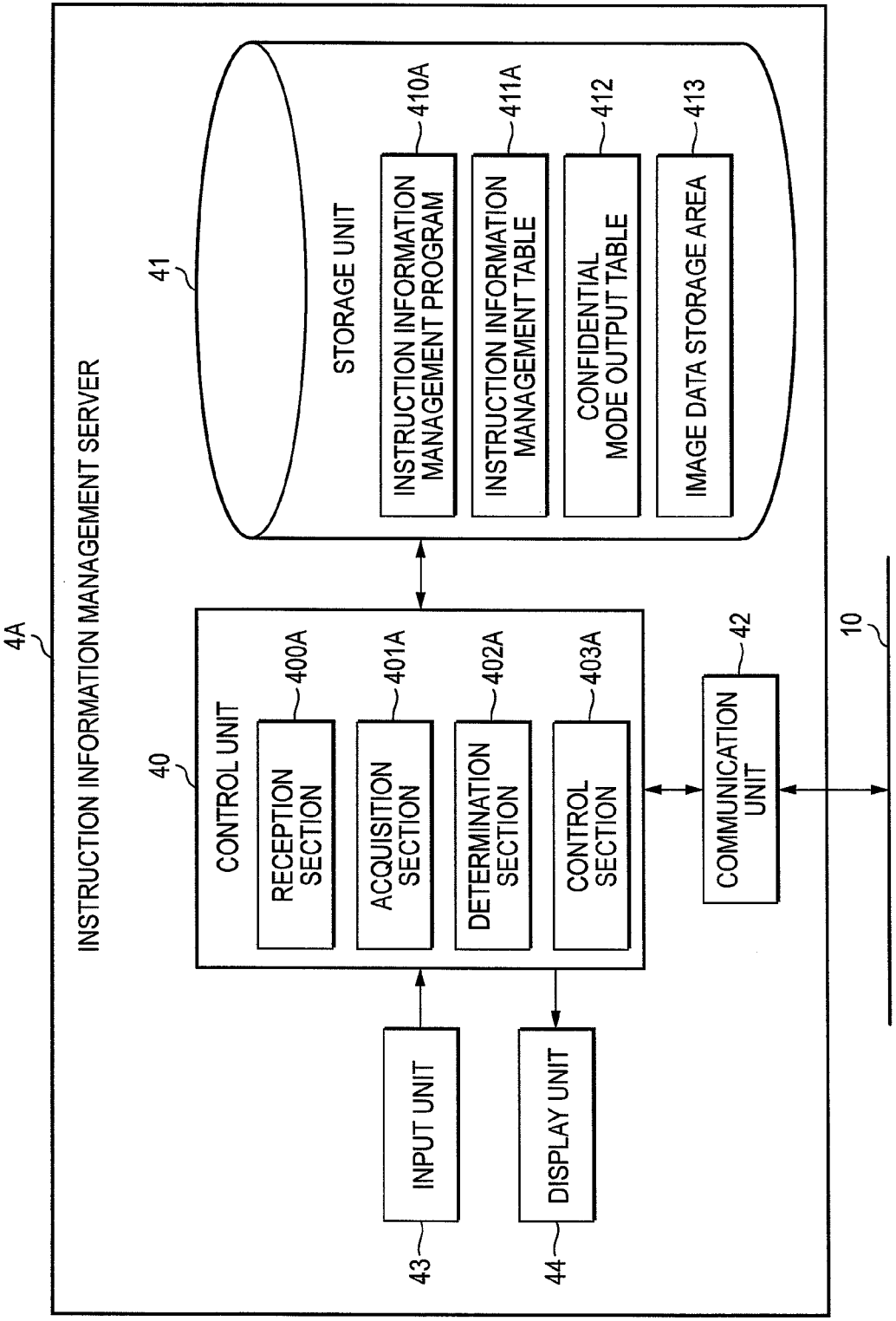
FIG. 4 is a block diagram illustrating an example of a schematic configuration of an instruction information management server according to the third exemplary embodiment of the invention.

FIG. 4 is a block diagram illustrating an example of a schematic configuration of an instruction information management server 4A. The instruction information management server 4A controls units of the instruction information management server 4A. For example, the instruction information management server 4A includes a control unit 40 including a CPU and the like; a storage unit 41 including a ROM, a RAM, a hard disk, and the like that store various kinds of programs, data, and the like; a communication unit 42 including a network interface card and the like, which is connected to the network 10 and transmits and receives data; a input unit 43 including a keyboard, a mouse, and the like for inputting data or receiving an operation instruction; and a display unit 44 including a liquid crystal display that displays a result or the like processed by the control unit 40.

In the storage unit 41, an instruction information management program 410A, an instruction information management table 411A, a confidential mode output table 412, and the like are stored. In an image data storage area 413 of the storage unit 41, image data of a printing target is stored.

FIG. 5A is a diagram illustrating an example of the instruction information management table 411A. In the instruction information management table 411A, the instruction information transmitted from the terminal 5 is stored and accumulated. That is, in the instruction information management table 411A, a target data name included in the instruction information, an output spot indicating a printer performing a printing process, and an instruction user name as identification information are stored, considering an instruction information ID for identifying the instruction information as a key.

FIG. 5B is a diagram illustrating an example of the confidential mode output table 412. In the confidential mode output table 412, pieces of information relating to persons for whom a print should be output in a confidential mode, that is, persons who don't have a certain relation with each user name are stored. For example, In the confidential mode output table 412 shown in FIG. 5B, a first-line record indicates that users who don't have a certain relation with a user A indicated in a column of "user name" are a user B and an outsider stored in a column of "persons for whom a print should be output in a confidential mode". In the confidential mode output table 412, pieces of information relating to persons who don't have a certain relation with each user may not be stored, but persons who have the certain relation with each user may be stored.

Herein, the "outsider" is defined as persons who does not belong to an enterprise or a division to which the user A belongs. For example, the persons are a visitor and a supplier. In addition, "persons for whom a print should be output in a confidential mode" may be designated as a unit of groups such as "sales division" and "development division", as shown in third-line and fourth-line records shown in FIG. 5B.

In the image data storage area 413, image data of a printing target associated with a target data name of the instruction information stored in the instruction information management table 411A is stored.

The control unit 40 operates according to the instruction information management program 410A stored in the storage unit 41 to function as: reception section 400A that receives instruction information from the terminal 5; acquisition section 401A that acquires entering-person information indicating a person who enters a room where the printers 6A and 6B indicated by the output spot of the instruction information are installed from the entering-leaving management apparatus 7, as third-person information; determination section 402A that determines whether or not the entering person of the entering-person information has a certain relation with an instruction user indicated by the instruction user name of the instruction information with reference to the confidential mode output table 412; and control section 403A that controls the printing process of the instruction information to be performed in a confidential printing mode when it is determined by the determination section that the third person doesn't have the certain relation with the instruction user.

The control section 403A transmits to the terminal 5 through the communication unit 42, a message indicating that the printing process is performed in the confidential printing mode when the printing process is controlled to be performed in the confidential printing mode, and the message may be displayed on a display screen of the terminal 5 to a user.

(Terminal)

The terminal 5 includes a CPU controlling units of the terminal 5; a storage unit including a ROM, a RAM, a hard disk, and the like that store programs such as an instruction information preparation program and a document preparation program, data, and the like; a communication unit including a network interface card and the like, which is connected to the network 10; a input unit including a keyboard, a mouse, and the like for inputting data or receiving an operation instruction; and a display unit including a liquid crystal display that displays a picture or the like.

Such a terminal 5 may be configured of, for example, a personal computer (PC), a personal digital assistant (PDA), or the like.

The CPU of the terminal 5 operates according to the instruction information preparation program stored in the storage section to function as: a display section that displays an instruction information input picture for inputting instruction information on the display unit; a preparation section that prepares the instruction information on the basis of the input information input by the input unit through the instruction information input picture; and transmission section that transmits the prepared instruction information to the instruction information management server 4A through the communication unit.

In addition, the CPU of the terminal 5 operates according to the document preparation program to function as: a preparation section that prepares a document to be printed, that is, image data; and a storing section that stores the prepared image data in the storage unit of the terminal 5. The image data to be printed may be stored in the instruction information management server 4A connected to the network 10 and may be inputted through an external recording medium or the like.

[Printer]

In addition to the aforementioned display operation units 60A and 60B, the first and second printers 6A and 6B each include: a CPU controlling units of printers 6A and 6B; a storage unit including a ROM, a RAM, a hard disk, and the like for storing a program such as a printer control program or data; a printing unit (printing section) that prints an image on a recording medium such as paper; and a communication unit including a network interface card and the like connected to the network 10.

The printing unit prints image data on a recording medium such as paper, and various kinds of methods such as an electrophotographic method, an inkjet method, and thermosensitive transfer method may be used for the printing unit.

The CPU of each of the printers 6A and 6B operates according to the printer control program stored in the storage unit to function as: a display section that displays a certification picture for inputting user information including a user name and a password on each of the display operation units 60A and 60B; transmission section that transmits to the instruction information management server 4A, the user information input through the certification picture displayed by each of the display operation units 60A and 60B through the communication unit; and reception section that receives the instruction information and the image data from the instruction information management server 4A and performs a printing process based on the instruction information and the image data by the printing unit.

(Entering-Leaving Management Apparatus)

The entering-leaving management apparatus 7 includes an ID information readout unit that reads out ID information for reading out a user from an ID card corresponding to the user, and an entering-leaving information management unit that manages the user entering and leaving each room on the basis of the ID information read out by the ID information readout unit.

The ID information readout unit is disposed at a gate or the like of a door of the room where each of the first and second printers 6A and 6B is installed. For example, the ID information readout unit has a circuit for communicating with an antenna of an RFID tag built in the ID card by the use of an electromagnetic induction operation or an electromagnetic wave and for reading out the ID information recorded in an IC chip of the RFID tag in a non-contact manner.

The entering-leaving information management unit is configured of, for example, a server, a personal computer (PC), a work station (WS), or the like. For example, the entering-leaving information management unit includes: a control unit including a CPU and the like that controls units of the entering-leaving information management unit; a reception unit that receives the ID information read out by the ID information readout unit; a storage unit including a ROM, a RAM, a hard disk, and like that stores data such as entering-person information, in which a state of persons entering each room is recorded on the basis of the ID information; a communication unit that is connected to the network 10 and transmits the entering-person information to the instruction information management server 4A.

[Operation of Third Exemplary Embodiment]

An example of operation of the printing system 1 according to the third exemplary embodiment of the invention will be described. Herein, there will be described a case where a user A inputs instruction information, in which the first printer 6A is an output spot, using the terminal 5 and the instruction information does not include printing mode information.

(1) Reception of Instruction Information

First, when a user A, using the terminal 5, instructs an instruction information input picture for inputting instruction information to be displayed, by the input unit of the terminal 5. The CPU of the terminal 5 receives the instruction and displays the instruction information input picture on the display unit. The user A inputs an own user name, a target data name, an output spot, and the like by the input unit through the displayed instruction information input picture.

Then, when the CPU of the terminal 5 receives the information input by the input unit, the CPU prepares instruction information on the basis of the input information.

Then, the CPU of the terminal 5 reads out image data indicated as a printing target by the target data name from the storage unit of the terminal 5, and transmits the image data together with the prepared instruction information to the instruction information management server 4A through the network 10.

Then, the reception section 400A of the instruction information management server 4A receives the instruction information and the image data transmitted from the terminal 5 through the communication unit 42, registers the received instruction information on the instruction information management table 411A of the storage unit 41, and stores the image data in the image data storage area 413.

(2) Acquisition of Entering-Person Information

When the instruction information is received, the acquisition section 401A of the instruction information management server 4A requests entering-person information indicating a person being in a printer-installed room where the first printer 6A indicated as the output spot of the instruction information is installed, to the entering-leaving management apparatus 7.

Then, when the entering-leaving management apparatus 7 receives the request from the instruction information management server 4A through the network 10, the entering-leaving management apparatus 7 reads out the entering-person information indicating the person being in the printer-installed room and transmits the entering-person information to the instruction information management server 4A.

Here, the entering-person information read out from the storage unit of the entering-leaving management apparatus 7 is information recorded by the entering-leaving management apparatus 7. That is, the entering-leaving management apparatus 7 continuously monitors the user entering and leaving the printer-installed room by the ID information readout unit disposed at a gate of a door of the printer-installed room. When any user enters or leaves the printer-installed room, the ID information readout unit reads out the ID information from an RFID tag of an ID card of the user. The entering-leaving information management unit of the entering-leaving management apparatus 7 identifies the user from the read ID information. The entering-leaving information management unit records entering-person information in a manner of adding the user to an entering-person list when the user enters the printer-installed room and deleting the user from the entering-person list when the user leaves the printer-installed room.

When the acquisition section 401A of the instruction information management server 4A acquires the entering-person information from the entering-leaving management apparatus 7, the acquisition section 401A transmits the acquired entering-person information to the determination section 402A.

(3) Determination of Certain Relation

When the determination section 402A of the instruction information management server 4A receives the entering-person information, the determination section determines whether or not an entering person indicated by the entering-person information, that is, a person being in the printer-installed room has a certain relation with a person indicated by the instruction user name of the instruction information received by the reception section 400A, that is, a user A, with reference to the confidential mode output table 412 shown in FIG. 5B.

Specifically, in the confidential mode output table 412 shown in FIG. 5B, the determination section 402A determines whether or not the person being in the printer-installed room is included in the column of "persons for whom a print should be output in a confidential mode" corresponding to the user A of "user name". When the person being in the printer-installed room is included in the column, it is determined that the person doesn't have the certain relation with the user A. When the person being in the printer-installed room is not included in the column, it is determined that the person has the certain relation with the user A.

For example, when the entering person indicated by the entering-person information is a user B or an outsider, the user B or the outsider is included in the column of "persons for whom a print should be output in a confidential mode" corresponding to the user A in the confidential mode output table 412 shown in FIG. 5B and thus the determination section 402A determines that the person in the printer-installed room doesn't have the certain relation with the user A.

When the person in the printer-installed room is any one of a user C and a user D or both of them, the user C and user D are not included in the column of "persons for whom a printer should be output in a confidential mode" corresponding to the user A in the confidential mode output table 412 shown in FIG. 5B and thus the determination section 402A determines that the person in the printer-installed has the certain relation with the user A.

The determination section 402A transmits to the control section 403A, the determination result indicating whether or not the person in the printer-installed room has the certain relation with the user A.

(4) Control of Printing Process

When the control section 403A of the instruction information management server 4A receives the determination result from the determination section 402A, the control section 403A controls the printing process in the first printer 6A to be performed on the basis of the determination result.

When the determination result of the determination section 402A indicates that the person has the certain relation with the user A, the control section 403A transmits to the first printer 6A, the instruction information stored in the instruction information management table 411A and the image data stored corresponding to the target data name of the instruction information in the image data storage area 413. That is, the control section 403A controls the printing process of the instruction information to be performed in the direct printing mode.

When the first printer 6A receives the instruction information and the image data transmitted from the instruction information management server 4A, the first printer 6A prepares a printing image from the received image data and prints the printing image on paper or the like on the basis of the content of the printing process of the instruction information, and then finishes the printing process.

Meanwhile, when the determination result of the determination section 402A indicates that the person doesn't have the certain relation with the user A, the control section 403A stores the instruction information in the instruction information management table 411A, and controls the printing process to be performed when the first printer 6A is operated for the printing process. That is, the control section 403A controls the printing process of the instruction information to be performed in the confidential mode.

Then, when the user A operates the first printer 6A using the display operation unit 60A so that the printing process of the instruction information stored in the instruction information management server 4A is performed, the CPU of the first printer 6A displays a certification picture for inputting user information on the display operation unit 60A.

When the user A inputs user information through the certification picture using the display operation unit 60A, the CPU of the first printer 6A transmits the input user information to the instruction information management server 4A.

When the control section 403A of the instruction information management server 4A receives the user information, the control section 403A extracts instruction information in which a user name indicated by the user information coincide with an instruction user name of the instruction information from the instruction information stored in the instruction information management table 411A. The control section 403A transmits to the first printer 6A, the extracted instruction information and the image data stored in the image data storage area 413 corresponding to the target data name of the extracted instruction information.

When the first printer 6A receives the instruction information and the image data transmitted from the instruction information management server 4A, the first printer 6A prints an image on paper or the like on the basis of the received image data and the content of the printing process of the instruction information, and then finishes the printing process, as described above.

Fourth Exemplary Embodiment

Figure 6:
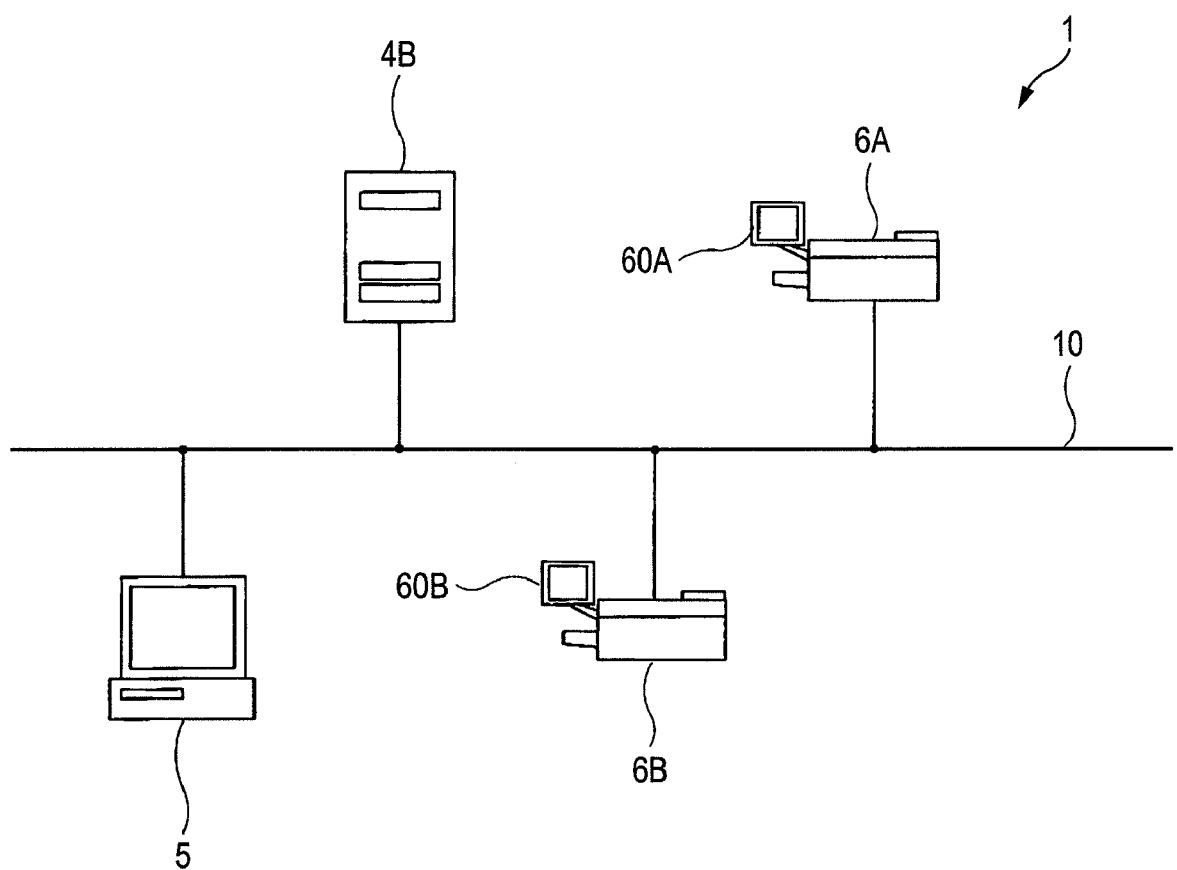
FIG. 6 is a general diagram illustrating an example of a schematic configuration of a printing system according to the fourth exemplary embodiment of the invention.

FIG. 6 is a general diagram illustrating an example of a schematic configuration of a printing system according to a fourth exemplary embodiment of the invention. In the instruction information management server 4A according to the third exemplary embodiment, the entering-person information is acquired as the third-person information from the entering-leaving management apparatus 7. However, an instruction information management server 4B according to the fourth exemplary embodiment, acquires user information indicating a user who is using or is going to use the first and second printers 6A and 6B.

The printing system 1 according to the fourth exemplary embodiment includes: a terminal 5 for inputting instruction information relating to a printing process; an instruction information management server 4B that manages a processing state of the printing process based on the instruction information received from the terminal 5 and controls the printing process to be performed; first and second printers 6A and 6B that perform the printing process on the basis of the instruction information and report the processing state to the instruction information management serve 4B; and a network 10 that connects them to one another.

[Instruction Information Management Server]

Figure 7:
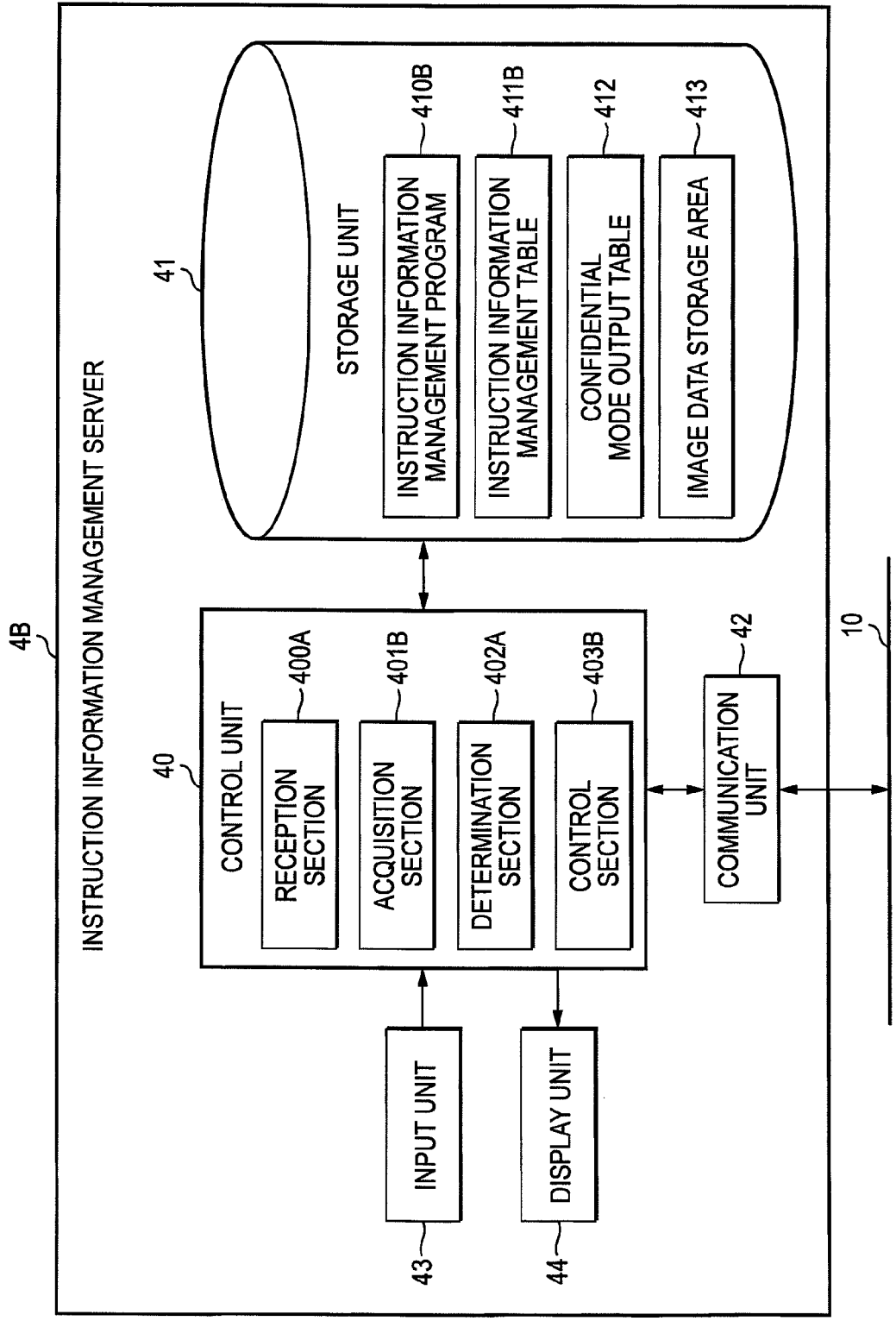
FIG. 7 is a block diagram illustrating an example of a schematic configuration of an instruction information management server according to the fourth exemplary embodiment of the invention.

FIG. 7 is a block diagram illustrating an example of a schematic configuration of the instruction information management server 4B. The instruction information management server 4B includes a control unit 40, a storage unit 41, a communication unit 42, an input unit 43, and a display unit 44, similarly with the instruction information management server 4A of the third exemplary embodiment.

In the storage unit 41, an instruction information management program 410B, an instruction information management table 411B, a confidential mode output table 412, and the like are stored. In an image data storage area 413 provided in the storage unit 41, image data of a printing target is stored. Since the confidential mode output table 412 is the same as that of the third exemplary embodiment, description thereof is omitted.

FIG. 8 is a diagram illustrating an example of the instruction information management table 411B. In the instruction information management table 411B, printing mode information and a processing state indicating an instruction information state are stored in addition to a target data name, an output spot, and an instruction user name, considering an instruction information ID for identifying instruction information as a key.

One state is selected from plural states indicating a state of processing instruction information, and is stored as the processing state. The plural states include, for example, three states of "printing", "completion", and "reservation". When the instruction information management server 4B transmits the instruction information to the first and second printers 6A and 6B, the state of "printing" is selected. When the instruction information management server 4B receives a report of the printing process of the first and second printers 6A and 6B, the state of "completion" is selected. Simultaneously, the completion time is also stored. When the instruction information is the confidential printing mode, the state of "reservation" is selected.

Regarding the processing state, the instruction information management server 4B regularly inquires a state of the printing process, that is, whether "printing" or "completion", to the printers 6A and 6B, and the processing state of the instruction information may be renewed.

The control unit 40 operates according to the instruction information management program 410B stored in the storage unit 41 to function as: (i) acquisition section 401B that acquires user information indicating a user who is using or is going to use the printers 6A and 6B indicated by the output spot of the instruction information as third-person information and (ii) control section 403B that controls a printing mode indicated by the printing mode information of the instruction information to be changed to another printing mode on the basis of the determination result of the determination section 402A, with reference to the instruction information management table 411B, in addition to the reception section 400A and the determination section 402A of the third exemplary embodiment.

(Operation of Fourth Exemplary Embodiment)

An example of operation of the printing system according to the fourth exemplary embodiment of the invention will be described. Herein, there will be described a case where a user A inputs instruction information, in which the first printer 6A is an output spot, using the terminal 5 and the instruction information includes printing mode information.

(1) Reception of Instruction Information

First, similarly with the third exemplary embodiment, when a user A instructs to the terminal 5, an instruction information input picture for inputting instruction information to be displayed, the CPU of the terminal 5 receives the instruction and displays the instruction information input picture on the display unit. The user A inputs an own user name, a target data name, an output spot, printing mode information, and the like by the input unit through the displayed instruction information input picture.

Then, the CPU of the terminal 5 prepares instruction information on the basis of the input information, and transmits the prepared instruction information and image data indicated by a target data name of the instruction information to the instruction information management server 4B.

Then, the reception section 400A of the instruction management server 4B receives the instruction information and the image data transmitted from the terminal 5 through the communication unit 42, registers the received instruction information in the instruction information management table 411B of the storage unit 41, and stores the image data in the image data storage area 413.

(2) Acquisition of User Information

When the reception section 400A receives the instruction information, the acquisition section 401B confirms a state indicating whether the first printer 6A indicated as the output spot of the instruction information is performing instruction information of another user or not, with reference to the instruction information management table 411B. That is, the acquisition section 401B extracts instruction information in which the first printer 6A is indicated as an output spot in the instruction information management table 411B, and confirms whether there is instruction information in which a processing state of the extracted instruction information is "printing". By way of example of the instruction information management table 411B shown in FIG. 8, instruction information in which an instruction information ID is "Job 1" corresponds to the above condition.

Then, the acquisition section 401B acquires user information, considering the instruction user indicated by the instruction user name of the instruction information, when there is instruction information in which the state is "printing". For example, in the instruction information management table 411B shown in FIG. 8, an instruction user name included in the instruction information of instruction information ID "Job1" is a user B, and thus the user information is acquired considering the user B as a user. The acquisition section 401B transmits the acquired user information to the determination section 402A.

(3) Determination of Certain Relation

When the determination section 402A receives the user information, the determination section 402A determines whether the user indicated by the user information has a certain relation with the user A inputting the instruction information or not with reference to the confidential mode output table 412, similarly with the third exemplary embodiment. The determination section 402A transmits to the control section 403B, the determination result indicating whether the user has the certain relation with the user A or not.

(4) Control of Printing Process

When the control section 403B receives the determination result from the determination section 402A, the control section 403B controls the printing process in the first printer 6A to be performed on the basis of the determination result.

Specifically, when the determination result of the determination section 402A indicates that the user has the certain relation with the user A, the control section 403B transmits the instruction information and the image data corresponding to the instruction information to the first printer 6A, so that the printing process based on the instruction information is performed in the direct printing mode. The control section 403B changes the processing state of the transmitted instruction information to "printing" in the instruction information management table 411B. The control section 403B more prioritizes the printing mode information than the determination result of the determination section 402A. Even when the determination result indicates that the user has the certain relation with the user A, the control section 403B may control the printing process to be performed in the confidential printing mode when the printing mode is the confidential printing mode.

Meanwhile, when the determination result of the determination section 402A indicates that the user doesn't have the certain relation with the user A, the control section 403B changes the process state of the instruction information to "reservation" in the instruction information management table 411B, and controls the printing process based on the instruction information to be performed in the confidential printing mode.

Then, similarly with the third exemplary embodiment, when the user A operates the first printer 6A using the display operation unit 60A so that printing process is performed, a certification picture is displayed on the display operation unit 60A. Thus, the user A inputs user information through the certification picture. And the CPU of the first printer 6A transmits the input user information to the instruction information management server 4B.

When the instruction information management server 4B receives the user information, the control section 403B of the instruction information management server 4B extracts instruction information, in which a user name indicated by the user information coincides with the instruction user name of the instruction information and the processing state is "reservation", from the instruction information stored in the instruction information management table 411B. Then, the control section 403B transmits to the first printer 6A, the extracted instruction information and the image data corresponding to the instruction information. The control section 403B changes the process state of the transmitted instruction information to "printing" in the instruction information management table 411B.

When the first printer 6A receives the instruction information and the image data transmitted from the instruction management server 4B, similarly with the third exemplary embodiment, the first printer 6A prints an image on paper or the like on the basis of the received image data and the content of the printing process of the instruction information, and then finishes the printing process.

The first printer 6A reports the completion of the printing process to the instruction information management server 4B. When the control section 403B of the instruction information management server 4B receives the report, the control section 403B changes the processing state of the instruction information to "completion".

In the above example, at the time of acquiring the user information, the acquisition section 401B confirms the state that the first printer 6A indicated as the output spot of the instruction information is performing instruction information of another user, with reference to the instruction information management table 411B, when the instruction information is received by the reception section 400A. In addition, the acquisition section 401B extracts the instruction information in which the first printer 6A is indicated as the output spot in the instruction information management table 411B, and confirms whether there is instruction information in which the processing state of the extracted instruction information is "printing". However, the invention is not limited thereto, and the user information may be acquired considering an instruction user indicated by the instruction user name of the instruction information in which present time and completion time fall within given time, as the user, in the instruction information of "completion". The reason is that the user does not straightly come for the printed result even when the printing is completed, and thus the user may encounter another user coming for another output result. To prevent such a situation, the given time may be appropriately set to equivalently consider instruction information in which an interval between the present time and the completion time falls within given time, as "printing".

Fifth Exemplary Embodiment

Figure 9:
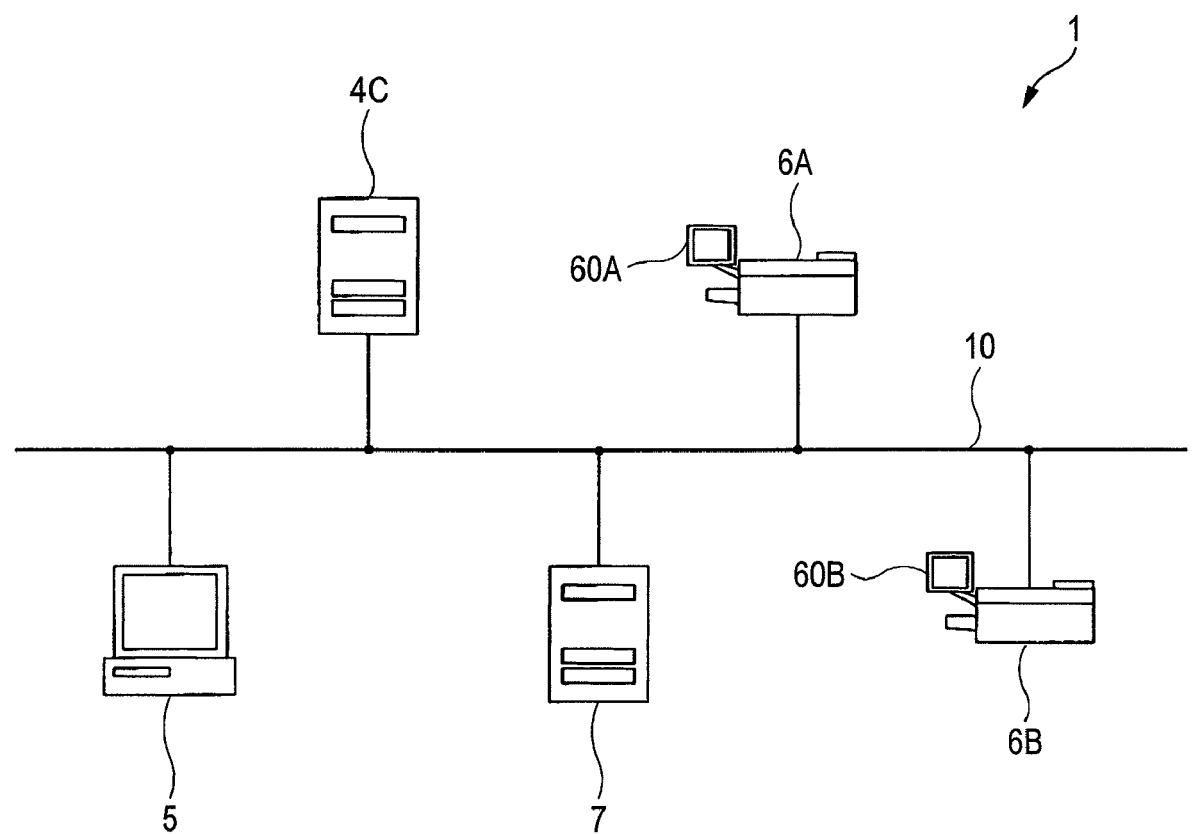
FIG. 9 is a general diagram illustrating an example of a schematic configuration of a printing system according to the fifth exemplary embodiment of the invention.

FIG. 9 is a general diagram illustrating an example of a printing system according to a fifth exemplary embodiment of the invention. The printing system 1 is configured by adding the entering-leaving management apparatus 7 according to the third exemplary embodiment to the printing system 1 according to the fourth exemplary embodiment.

That is, the printing system 1 according to the present exemplary embodiment includes a terminal 5 for inputting instruction information about a printing process, an instruction information management server 4C that manages a processing state based on the instruction information received from the terminal 5 and controls a printing process to be performed, first and second printers 6A and 6B that perform the printing process on the basis of the instruction information and report the processing state to the instruction information management serve 4C, an entering-leaving management apparatus 7 that manages a record of a third person entering and leaving rooms where the first and second printers 6A and 6B are installed, respectively, and a network 10 that connects them to one another.

[Instruction Information Management Server]

Figure 10:
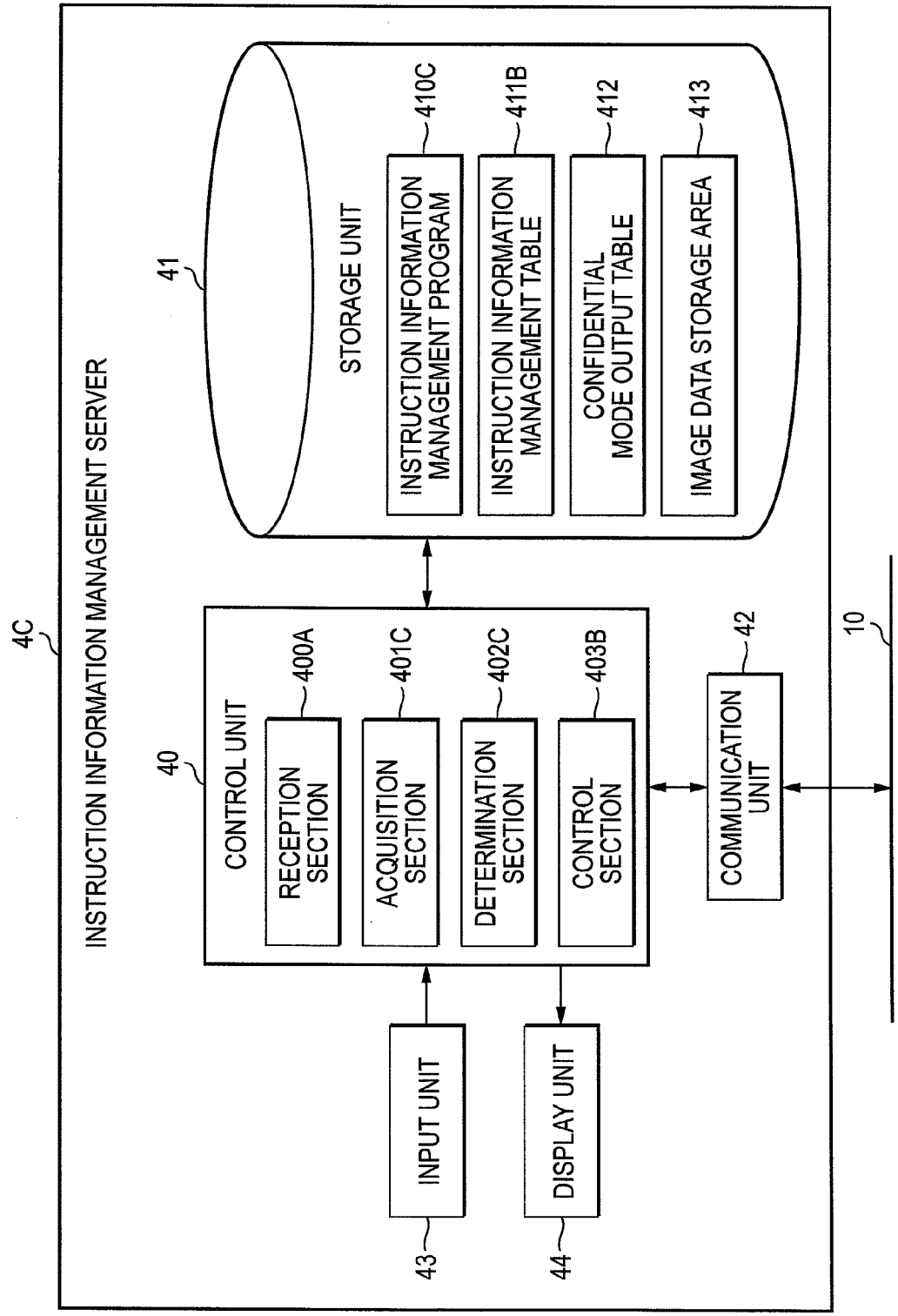
FIG. 10 is a block diagram illustrating an example of a schematic configuration of an instruction information management server according to the fifth exemplary embodiment of the invention.

FIG. 10 is a block diagram illustrating an example of a schematic configuration of the instruction information management server 4C. The instruction information management server 4C includes a control unit 40, a storage unit 41, a communication unit 42, an input unit 43, and a display unit 44, similarly with the instruction information management server 4B of the fourth exemplary embodiment.

In the storage unit 41, an instruction information management program 410C, an instruction information management table 411B, a confidential mode output table 412, and the like are stored. In an image data storage area 413 provided in the storage unit 41, image data of a printing target is stored. Since the confidential mode output table 412 and the image data storage area 413 are the same as those of the third exemplary embodiment and the instruction information management table 411B is the same as that of the fourth exemplary embodiment, the description thereof is omitted.

The control unit 40 operates according to the instruction information management program 410C stored in the storage unit 41 to function as: acquisition section 401C for acquiring entering-person information of a person entering a room, where the printers 6A and 6B are installed, as third-person information relating to the printers 6A and 6B indicated by the instruction information, from the entering-leaving management apparatus 7 and the acquisition section 401C for acquiring user information of the printers 6A and 6B from the instruction information management table 411B; and determination section 402C for determining whether or not a third person indicated by the entering-person information and the user information has a certain relation with a user indicated by an instruction user name of the instruction information with reference to the confidential mode output table 412, in addition to the same reception section 400A as that of the third exemplary embodiment and the same control section 403B as that of the fourth exemplary embodiment.

(Operation of Fifth Exemplary Embodiment)

An example of operation of the printing system 1 according to the fifth exemplary embodiment of the invention will be described. Herein, there will be described a case where a user A inputs instruction information, in which the first printer 6A is an output spot, using the terminal 5 and the instruction information includes printing mode information.

(1) Reception of Instruction Information

First, similarly with the fourth exemplary embodiment, when a user A instructs to the terminal 5 displaying an instruction information input picture for inputting instruction information, and inputs an own user name, a target data name, an output spot, printing mode information, and the like by the input unit through the displayed instruction information input picture.

Then, the CPU of the terminal 5 prepares instruction information on the basis of the input information, and transmits the prepared instruction information and image data indicated by a target data name of the instruction information to the instruction information management server 4C.

Then, the reception section 400A of the instruction management server 4C receives the instruction information and the image data transmitted from the terminal 5 through the communication unit 42, registers the received instruction information in the instruction information management table 411B of the storage unit 41, and stores the image data in the image data storage area 413.

(2) Acquisition of Entering-Person Information and User Information

Similarly with the third exemplary embodiment, when the instruction information is received by the reception section 400A, the acquisition section 401C acquires entering-person information indicating a person being in a room where the first printer 6A is installed, from the entering-leaving management apparatus 7. Similarly with the fourth exemplary embodiment, the acquisition section 401C acquires user information indicating a user of the first printer 6A with reference to the instruction information management table 411B.

Then, the acquisition section 401C transmits the acquired entering-person information and user information to the determination section 402C as the third-person information.

(3) Determination of Certain Relation

When the determination section 402C receives the entering-person information and the user information, the determination section 402C determines whether or not each third person indicated by the entering-person information and the user information has a certain relation with the user A instructing the instruction information with reference to the confidential mode output table 412.

For example, when the entering person indicated by the entering-person information doesn't have the certain relation with the user A, the determination section 402C determines that the person doesn't have the certain relation with the user A. Even when the entering person indicated by the entering-person information has the certain relation with the user A, the determination section 402C determines that the person doesn't have the certain relation with the user A when the user indicated by the user information doesn't have the certain relation with the user A.

The determination section 402C transmits to the control section 403B, the determination result indicating whether or not the user has the certain relation with the user A.

(4) Control of Printing Process

Similarly with the fourth exemplary embodiment, when the control section 403B receives the determination result from the determination section 402C, the control section 403B transmits the instruction information and the image data corresponding to the instruction information to the first printer 6A at the time when the determination result of the determination section 402C indicates that the person has the certain relation with the user A. The control section 403B changes the processing state of the transmitted instruction information to "printing" in the instruction information management table 411B.

Meanwhile, when the determination result of the determination section 402C indicates that the person doesn't have the certain relation with the user A, the control section 403B changes the processing state of the instruction information to "reservation" in the instruction information management table 411A and controls the printing process based on the instruction information to be performed in the confidential printing mode.

When the user A operates the first printer 6A using the display operation unit 60A so that the printing process is performed, a certification picture is displayed on the display operation unit 60A and then the user inputs user information to the certification picture. The CPU of the first printer 6A transmits the input user information to the instruction information management server 4C.

When the control section 403B of the instruction management server 4C receives the user information, the control section 403B transmits the instruction information extracted from the instruction information stored in the instruction management table 411B and the image data corresponding to the instruction information to the first printer 6A, similarly with the fourth exemplary embodiment. The control section 403B changes the processing state of the transmitted instruction information to "printing" in the instruction information management table 411B.

When the first printer 6A receives the instruction information and the image data, the first printer 6A prints an image on paper or the like on the basis of the received image data and the content of the printing process of the instruction information, and then finishes the printing process.

Then, the first printer 6A reports the completion of the printing process to the instruction information management server 4C. When the control section 403B of the instruction management server 4C receives the report, the control section 403B changes the processing state of the instruction information to "completion".

Another Exemplary Embodiment

The invention is not limited to the aforementioned exemplary embodiments and may be variously modified within the scope of the concept of the invention. In the exemplary embodiments, the reception section, the acquisition section, the determination section, and the control section of the instruction information management servers 4A to 4C are realized by the control unit 40 and the instruction information management programs 410A to 410C. However, for example, a part or all of them may be realized by hardware such as an application specific integrated circuit (ASIC: Application Specific IC).

In the printing systems according to the third to fifth exemplary embodiment, the control unit 40 of the instruction information management servers 4A to 4C operates according to the instruction information management programs 410A to 410C and includes the reception section, the acquisition section, the determination section, and the control section. However, the control unit of the first and second printers 6A and 6B may operate according to the instruction information management program and may include the reception section, the acquisition section, the determination section, and the control section, similarly with the printing apparatus 3B according to the second exemplary embodiment.

The programs used in the exemplary embodiments may be read from a recording medium such as CD-ROM into the storage unit of the apparatus, and may be downloaded from a server connected to a network such as an internet into the storage unit of the apparatus.

What is claimed is:

1. A non-transitory computer readable medium storing a program causing a computer to execute a process for controlling a printing process, the process comprising:

receiving instruction information including (i) a content of the printing process for printing image data and (ii) identification information of an instruction user instructing the printing process, the content of the printing process which includes detailed information for printing the image data;

acquiring when the instruction information is received, third-person information indicating a third person staying around a printing apparatus which performs the printing process;

determining whether or not the third person indicated by the acquired third-person information has a certain relation with the instruction user indicated by the identification information included in the received instruction information;

determining a mode of the printing process in the printing apparatus; and controlling the printing process in the determined mode, wherein the acquiring the third-person information acquiring the third-person information based on an entering-leaving history having entering and leaving records about an area where the printing apparatus is installed, and wherein the third person indicated by the third-person information is a person being in the area.

2. The computer readable medium according to claim 1, wherein the process further comprising:

controlling the printing process to be performed when the printing process to be performed is instructed directly to the printing apparatus, when determined that the third person doesn't have the certain relation with the instruction user.

3. The computer readable medium according to claim 1, wherein the instruction information further including (iii) printing mode information indicating one printing mode of a confidential printing mode in which the printing process is performed when the printing apparatus is operated for performing the printing process and a direct printing mode in which the printing process is performed without waiting for the printing apparatus being operated, and the process further comprising:

changing the one printing mode indicated by the printing mode information included in the instruction information to the direct printing mode.

4. The computer readable medium according to claim 1, wherein the acquiring the third-person information acquires the third-person information when the printing apparatus is performing a different printing process from the printing process based on the instruction information, and the third person indicated by the third-person information is the instruction user indicated by the identification information included in the instruction information included in the different printing process.

5. An instruction information management apparatus comprising:

a reception section that receives instruction information including (i) a content of a printing process for printing image data and (ii) identification information of an instruction user instructing the printing process, the content of the printing process including detailed information for printing the image data;

an acquisition section that acquires when the instruction information is received by the reception section, third-person information indicating a third person staying around a printing apparatus which performs the printing process;

a determination section that determines whether or not the third person indicated by the third-person information acquired by the acquisition section has a certain relation with the instruction user indicated by the identification information included in the instruction information received by the reception section; and a control section that determines a mode of the printing process in the printing apparatus and controls the printing process, based on a result determined by the determination section, wherein the acquisition section acquires the third-person information based on an entering-leaving history having entering and leaving records about an area where the printing apparatus is installed, and wherein the third person indicated by the third-person information is a person being in the area.

6. A printing apparatus comprising:

a printing section that performs a printing process of printing image data;

a reception section that receives instruction information including a content of the printing process and identification information of an instruction user instructing the printing process, the content of the printing process including detailed information for printing the image data;

an acquisition section that acquires third-person information indicating a third person staying around the printing apparatus when the instruction information is received by the reception section;

a determination section that determines whether or not the third person indicated by the third-person information acquired by the acquisition section has a certain relation with the instruction user indicated by the identification information included in the instruction information received by the reception section; and a control section that determines a mode of the printing process in the printing section and controls the printing process, based on a result determined by the determination section, wherein the acquisition section acquires the third-person information based on an entering-leaving history having entering and leaving records about an area where the printing apparatus is installed, and wherein the third person indicated by the third-person information is a person being in the area.

7. A printing system comprising:

a printing apparatus that performs a printing process of printing image data;

a reception section that receives instruction information including a content of the printing process and identification information of an instruction user instructing the printing process;

an acquisition section that acquires third-person information indicating a third person staying around the printing apparatus for performing the printing process when the instruction information is received by the reception section;

a determination section that determines whether or not the third person indicated by the third-person information acquired by the acquisition section has a certain relation with the instruction user indicated by the identification information included in the instruction information received by the reception section; and a control section that determines a mode of the printing process in the printing apparatus and controls the printing process, based on a result determined by the determination section, wherein the acquisition section acquires the third-person information based on an entering-leaving history having entering and leaving records about an area where the printing apparatus is installed, and wherein the third person indicated by the third-person information is a person being in the area.

* * * * *